July 8, 1952
L. M. SWIFT
2,602,833
CASING COLLAR LOCATOR
Filed July 15, 1948
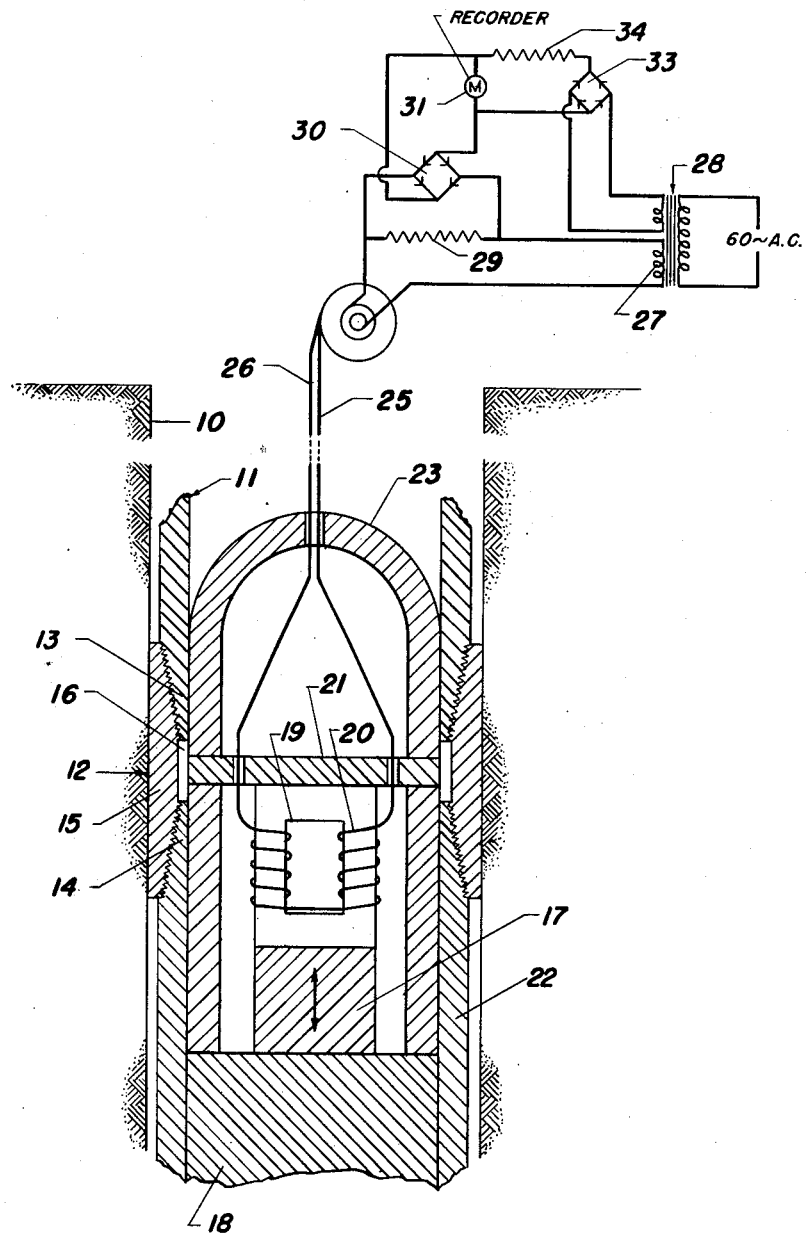
INVENTOR.
LAWRENCE M. SWIFT
BY James Y. Cleveland
ATTORNEY Patented July 8, 1952

2,602,833

UNITED STATES PATENT OFFICE 2,602,833

CASING COLLAR LOCATOR

Lawrence M. Swift, Tulsa, Okla., assignor to Well Surveys, Incorporated, Tulsa, Okla., a corporation of Delaware Application July 15, 1948, Serial No. 38,825

3 Claims. (Cl. 175—183)

This invention relates to the art of well logging and well casing perforation and more especially to a method and apparatus for indicating or recording the presence of casing collars in the string of casing that is positioned in a well, such as an oil well.

When logging a well through casing or when perforating the casing disposed in a well the depth of the logging or perforating instrument must be known to a high degree of accuracy. The usual process for determining this depth is to measure the amount of cable payed out from the surface as the logging instrument or perforator is lowered into the well. Experience has shown that such measurements are not always accurate. It is difficult to measure accurately the amount of cable payed out; the cable is inclined to stretch due to its own weight and the weight of the instrument attached to its lower end; and at times the instrument may bind to a greater or lesser degree in the drill hole. For all of these reasons it is desired to accurately confirm the depth measurements obtained by measuring the amount of cable payed out.

In accordance with the present invention, it has been found that accurate indications of depth may be obtained, which may be used to check against the measurements of the amount of cable payed out, or may be used instead of these measurements by generating an appropriate signal each time the instrument passes one of a series of markers already placed at a fixed depth in the well and impressing these signals on an indicator or recorder. Such markers are preferably the junctions between the sections of the well casing. Since well casing normally consists of standard lengths of pipe joined by steel collars, there occurs in the ordinary cased well a difference that can easily be detached at each junction between casing sections. This difference consists in a break in the casing wall and the additional band of steel comprising the collar, which surrounds the break and connects adjacent lengths of casing.

Under such conditions, if a magnetic field is created in the well bore and caused to be of such configuration as to extend into the surrounding casing, and this field is lowered down the well bore, it will remain substantially unchanged except when it passes a junction between two casing sections. At that time, the break in the casing wall, will alter the reluctance of the magnetic circuit to produce a change in the magnetic flux flowing therein. This change in magnetic flux is caused to vary the alternating current impedance of an associated circuit which connects with an indicator or recorder and a source of alternating current at the surface. The variation in the flow of alternating current, in this circuit, as occasioned by a change in the impedance of the circuit, produces an indication or record of a casing joint when it is traversed by the instrument.

Therefore, the present invention has for its primary object the provision of a method and means adapted for use with either a casing perforator or a well logging instrument for locating casing joints in a cased well.

Another object of this invention resides in the provision of a magnetic device adapted to be lowered or raised in a drill hole and which has associated therewith an alternating current circuit in which a signal is produced when a casing joint is traversed.

Other objects and advantages of the present invention will become apparent from the following detailed description when considered with the drawing, in which the present invention is shown schematically in operative position in a well.

Referring to the drawing in detail the well 10 is provided with a casing 11. Only enough of the well is illustrated to show a single casing joint 12. The joint 12 consists of adjacent ends 13 and 14 of casing sections and the collar 15. A space 16 is formed between the adjacent ends due to the fact that the casing collar threads do not permit the joints to "make up" completely.

Disposed within the casing 11 is the casing collar locator constructed in accordance with the principles of this invention. A permanent magnet 17, which is magnetized in the direction indicated by the arrow, engages, at its bottom end, a cylinder 18 formed of iron. Cylinder 18 may be the bottom of the instrument. The top of magnet 17 engages a closed magnetic core 19 which preferably is made of laminations formed of a high permeability material, such as that sold under the trade name of "Mu-Metal." The effective permeability of the material forming the core 19 is greatly reduced by high flux densities. This core is provided with a winding 20 that is wound in such a direction that an alternating current flowing through it induces an alternating flux that circulates largely in the core 19. Immediately above and engaging the core 19 is a relatively thin disk 21 that is preferably formed of soft iron. Elements 22 and 23 constitute the protecting shell or housing for the instrument and should be formed of non-magnetic material and 15 is a casing collar.

In any position of the instrument within the casing, other than that shown and those adjacent other joints in the casing 11, a complete magnetic circuit is obtained through the magnet 17, the core 19, the disk 21, the casing 11 and iron cylinder 18. The flux density through the core 19 is then high and the impedance of the winding 20 to alternating current is relatively low due to saturation of the core 19. However, when the instrument is moved to the position shown the reluctance of the magnetic circuit is increased by the presence of the gap or space 16. The increased reluctance reduces the total flux through the core 19 as well as the remainder of the magnetic circuit. The impedance of the winding 20 to alternating current is then increased appreciably due to a reduction of the flux in the core 19 to a value that is less than the saturation value. This change in impedance will produce a change in any value of alternating current which is flowing in the winding 20 when a joint is traversed.

Alternating current is supplied to the winding 20 by means of conductors 25 and 26 which are connected to a secondary winding 27 of a transformer 28 whose primary winding is connected to a conventional 60 cycle power source, not shown. The transformer 28 and power source are located on the surface of the earth.

The change in alternating current flowing in the circuit described above could be indicated at the surface by any form of alternating current bridge or ohmmeter but the indicating circuit shown is preferred.

In operation a low alternating current voltage is impressed on the winding 20 by the secondary winding 27 of transformer 28 through a resistor 29 and the conductors 25 and 26. The voltage drop across the resistor 29 is rectified by the rectifier 30 and impressed on the meter or recorder 31. This circuit alone would operate to indicate changes in the alternating current, but since the changes are relatively small, it is desirable to "buck out" a portion of the minimum signal supplied by a signal from a second secondary winding 32 of transformer 28 that is rectified by rectifier 33 and also impressed on the meter or recorder 31 through a resistance 34, so that a meter or recorder of higher sensitivity may be used.

Now as the instrument is moved in the drill hole the meter or recorder serves to indicate that the periphery of the disk 21 is adjacent to a casing collar, and measurement may be made from that selected collar to the point where it is desired to locate a perforator for the purpose of perforating the casing.

It is obvious that one of the conductors 25 or 26 can be eliminated and that side of the circuit be made through the earth, if desired. It is also obvious that other circuits, such as a gun perforator firing circuit, may be inserted in series with the winding 20 provided that their effect on the alternating current flowing is constant and not too great. In the case of a perforator, when it is to be fired, the conductors 25 and 26 may be switched at the surface to a direct current firing circuit. The direct current resistance of the winding 20 is not high enough to disturb the operation of this equipment.

The present invention finds particular application in well surveying and well perforation. When making a log of a cased drill hole the present invention or a similar device may be used to make a record of the casing collars simultaneously with the production of the log. Then when it is desired to perforate the well at a given horizon the present invention is used in conjunction with a gun perforator to exactly locate the gun perforator at the horizon where it is desired to perforate the casing.

I claim:

1. An apparatus for locating collars in the casing of a cased well that comprises a permanent magnet, elements connected in circuit with said magnet defining with the well casing a magnetic circuit, the reluctance of said circuit being adapted to be varied by traversing a casing collar, said elements consisting of a laminated high permeability element disposed in abutting relationship to said permanent magnet, pole pieces carried by the outer ends of the permanent magnet and laminated element respectively, a winding on said laminated element, means for connecting said winding in an alternating current circuit which includes a source of alternating current, and means for indicating changes in the alternating current occasioned by a change in impedance of the winding resulting from a change in permeability of the laminated element due to a change in flux flowing therethrough when a casing collar is traversed.

2. An apparatus adapted for use in positioning a gun perforator in a cased well that comprises elements that form with the well casing a magnetic circuit, a permanent magnet in said circuit, an element formed of laminated high permeability material disposed in abutting relationship to the permanent magnet and forming a link in the magnetic circuit, pole pieces carried by the outer ends of the permanent magnet and link respectively also serving as links in the magnetic circuit, means for traversing the well with the magnetic circuit and gun perforator, the reluctance of said magnetic circuit varying when a gap in the casing at a collar is traversed, indicating equipment located on the surface of the earth, an alternating current circuit including a source of alternating current, means at the surface for connecting the alternating current circuit to the indicating equipment, means associated with the magnetic circuit also connected to said alternating current circuit, and a coil wound upon the laminated high permeability link in the magnetic circuit that is responsive to conditions controlled by the change in reluctance of the magnetic circuit for producing a change in the alternating current flowing in the alternating current circuit as an indication of traversing a casing collar.

3. A casing collar locator of the type that is adapted to be carried by a subsurface instrument of the type which traverses a cased drill hole that comprises in combination a plurality of elements connected in a series magnetic circuit that are adapted to form with the well casing a magnetic circuit, said elements including a permanent magnet, a laminated high permeability element disposed in abutting relationship to one end of said permanent magnet, pole pieces carried by the outer ends of the permanent magnet and laminated element respectively, said pole pieces being substantially disc shape and each lying in separate substantially horizontal planes and presenting their peripheral edges to the casing of the well to thereby complete with the well casing a magnetic circuit, a coil disposed about at least a portion of the laminated element, and means connected to the coil for indicating changes in the flow of flux in the magnetic circuit when the reluctance of the circuit is changed as by traversing a casing collar.

LAWRENCE M. SWIFT.

REFERENCES CITED

The following references are of record in the file of this patent:

UNITED STATES PATENTS

| Number | Name | Date |
|---|---|---|
| 2,226,275 | Abbott et al. | Dec. 24, 1940 |
| 2,228,623 | Ennis | Jan. 14, 1941 |
| 2,250,703 | Crites et al. | July 29, 1941 |
| 2,255,053 | Gunn | Sept. 9, 1941 |